(12) United States Patent
Wells et al.

(10) Patent No.: US 9,847,695 B2
(45) Date of Patent: Dec. 19, 2017

(54) MOBILE ENERGY GENERATOR

(71) Applicant: Toyota Motor Engineering & Manufacturing North America, Inc., Erlanger, KY (US)

(72) Inventors: Keith Wells, Evansville, IN (US); Robert D. McClain, Haubstadt, IN (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/826,700

(22) Filed: Aug. 14, 2015

(65) Prior Publication Data

US 2017/0047815 A1 Feb. 16, 2017

(51) Int. Cl.

| H02K 7/116 | (2006.01) |
|---|---|
| H02K 7/18 | (2006.01) |
| B62D 65/02 | (2006.01) |
| F21S 9/04 | (2006.01) |
| F21W 131/402 | (2006.01) |
| B65G 35/06 | (2006.01) |

(52) U.S. Cl.
CPC ........... H02K 7/116 (2013.01); B62D 65/022 (2013.01); F21S 9/04 (2013.01); H02K 7/1846 (2013.01); B65G 35/06 (2013.01); F21W 2131/402 (2013.01)

(58) Field of Classification Search
CPC ...... H02K 7/116; B62D 65/022; B65G 17/34; F21S 9/04

USPC ............................................. 290/1 C; 29/428
See application file for complete search history.

(56) References Cited

U.S. PATENT DOCUMENTS

| 881,599 | A | * | 3/1908 | Maher | B61D 43/00 105/114 |
|---|---|---|---|---|---|
| 2,159,885 | A | * | 5/1939 | Cullin | F02B 63/04 320/DIG. 34 |
| 3,484,002 | A | * | 12/1969 | Barry | B60K 1/00 104/20 |
| 5,449,056 | A | * | 9/1995 | Ross | B65G 54/02 191/15 |
| 5,503,259 | A | | 4/1996 | Clopton et al. | |
| 5,549,050 | A | * | 8/1996 | Rhodes | B61B 10/04 104/172.2 |
| 5,690,209 | A | | 11/1997 | Kofoed | |
| 5,767,663 | A | * | 6/1998 | Lu | B60K 25/08 180/24 |
| 5,921,334 | A | * | 7/1999 | Al-Dokhi | B60L 8/00 180/2.2 |
| 7,306,089 | B2 | | 12/2007 | Ellens | |
| 7,913,783 | B2 | * | 3/2011 | Elmaleh | B60K 25/00 180/65.31 |

(Continued)

Primary Examiner — Tulsidas C Patel
Assistant Examiner — Charles Reid, Jr.
(74) Attorney, Agent, or Firm — Christopher G Darrow; Darrow Mustafa PC

(57) ABSTRACT

A system for recycling energy within an assembly line includes a mobile power generator attached to a conveyer platform (a.k.a. a "skillet") or other conveyance within the assembly line. The mobile power generator has a drive wheel that contacts an adjacent surface, such as a floor, and is rotated by movement of the conveyance along or past the surface. Rotation of the drive wheel is transmitted to a low RPM electrical generator to produce electrical energy at the conveyance.

12 Claims, 6 Drawing Sheets

(56) References Cited

U.S. PATENT DOCUMENTS

| | | | | |
|---|---|---|---|---|
| 7,982,323 | B2 * | 7/2011 | Seghezzi | F16H 1/203 |
| | | | | 180/291 |
| 8,872,368 | B1 * | 10/2014 | Kim | B61D 43/00 |
| | | | | 290/1 C |
| 2005/0063194 | A1 * | 3/2005 | Lys | B60Q 1/2696 |
| | | | | 362/545 |
| 2007/0030349 | A1 * | 2/2007 | Riley | H04N 7/181 |
| | | | | 348/143 |
| 2010/0154449 | A1 * | 6/2010 | Stover, Jr. | B60H 1/00364 |
| | | | | 62/236 |
| 2010/0327600 | A1 * | 12/2010 | Koelsch | B60K 25/08 |
| | | | | 290/1 A |
| 2012/0223530 | A1 * | 9/2012 | Lee | H02K 7/1823 |
| | | | | 290/1 C |
| 2013/0056330 | A1 * | 3/2013 | Chierego | B65G 47/96 |
| | | | | 198/574 |

* cited by examiner

MOBILE ENERGY GENERATOR

TECHNICAL FIELD

The present disclosure generally relates to a device for generating electrical power, and more particularly, to power generation in an assembly facility.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

An assembly line, such as in an automobile factory, will commonly have a conveyer system in which individual assemblies or sub-assemblies are transported through the line on platform conveyers, also known as "skillets". Often, one or more technicians will operate on an assembly that is positioned on a skillet at various points in the assembly line.

In some instances it can be difficult to provide adequate illumination of a portion of an assembly to be operated on by a technician. For example, the undercarriage of an automobile assembly may be poorly lit unless dedicated lights are positioned to illuminate it. To work as desired, such dedicated lights may need to be positioned on, or otherwise travel with, the skillet. Such lights require power.

Existing options to power mobile lights on a skillet include an electrified rail to provide power to a skillet throughout the entire line, or induction lights mounted in the skillet with inducers positioned at one or more locations in the line. Either approach can be expensive to install and maintain and, in the case of the electrified rail, limit the turn radius of conveyer. Thus an inexpensive and flexible system for providing power to a conveyer would be desirable.

SUMMARY

This section provides a general summary of the disclosure, and is not a comprehensive disclosure of its full scope or all of its features.

In various aspects, the present teachings provide, a mobile power generation system for an assembly line. The system includes a plurality of conveyer platforms, each conveyer platform configured to move through the assembly line while supporting an assembly. Each conveyer platform of the plurality further includes a drive wheel and a generator. The drive wheel is configured to be placed in an interference position with a stationary surface, such that movement of the platform past the stationary surface when the drive wheel is in the interference position causes rotation of the drive wheel. The generator has a rotatable element, such that rotation of the rotatable element causes the generator to produce electrical power, and the rotatable element is in mechanical contact with the drive wheel, such that movement of the platform past the stationary surface causes rotation of the rotatable element, resulting in production of electrical power.

In other aspects, the present teachings provide a mobile power generation device. The device includes a drive wheel, a generator, a transmission and a suspension member. The drive wheel is configured to be placed in an interference position with a stationary surface, such that movement of the platform past the stationary surface when the drive wheel is in the interference position causes rotation of the drive wheel. The generator has a rotatable element, such that rotation of the rotatable element causes the generator to produce electrical power. The transmission is configured to transmit rotation of the drive wheel to the rotatable element at a gear ratio less than 0.1, such that a rotation rate of the rotatable element, in RPM, is more than ten times greater than a rotation rate of the drive wheel, in RPM. And the suspension member is in mechanical communication with the drive wheel and is configured to modify a contact force applied by the drive wheel on the stationary surface, the contact force effective to prevent the drive wheel from slipping.

In yet other aspects, the present teachings provide a method for enabling lighting at a conveyer platform. The method includes a step of coupling a mobile power generation device to the conveyer platform. The device includes a drive wheel configured to be placed in an interference position with a stationary surface, such that movement of the platform past the stationary surface causes rotation of the drive wheel. The device also includes a generator having a rotatable element in mechanical contact with the drive wheel, such that movement of the platform past the stationary surface causes rotation of the rotatable element resulting in production of electrical power. The method includes a step of moving the conveyer platform relative to the stationary surface resulting in rotation of the drive wheel, and generating power by transmitting rotation of the drive wheel to rotation of the rotatable element. The method also includes a step of illuminating a platform space with one or more lights that are in electrical communication with the generator.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
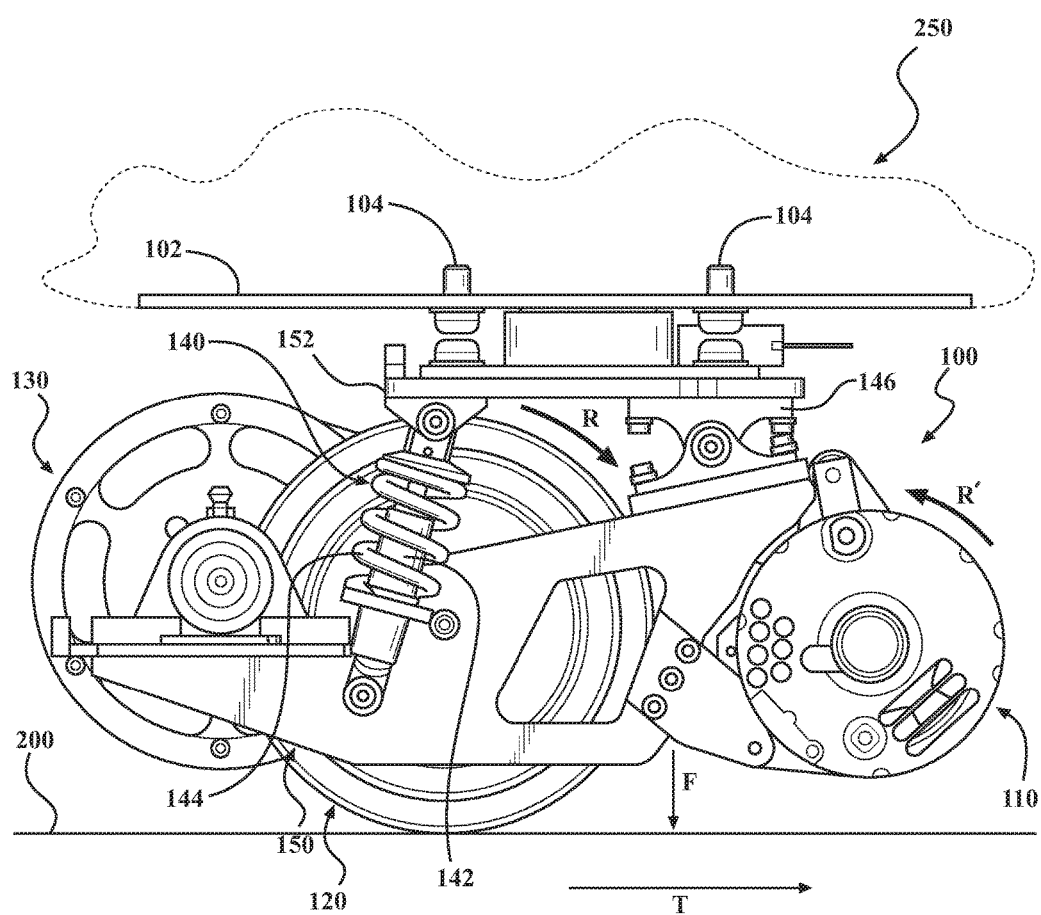
FIG. 1 is a side plan view of a device for generating power in an assembly line.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The present teachings provide systems, devices, and methods for generating power in an assembly line. The device of the present disclosure can power mobile lighting on a conveyer platform, or "skillet", to improve visibility for workers operating on an assembly or subassembly. For example, the device of the present disclosure can power illumination of the undercarriage of automobile assemblies in an assembly line. The unique design of the power generation device enables tunable power generation and eliminates the need for electrified rails or other expensive long-distance conductive systems.

The device of the present disclosure includes a low RPM electric generator configured to generate an electric current when operated at a rate within a range of 100 to 1000 RPM, a drive wheel configured to be placed into an interference position with a stationary surface, exerting a force on the stationary surface such that the wheel rotates at a rate less than 100 RPM, and a transmission configured to transmit rotation of the drive wheel to the generator with a gear ratio.

Accordingly, and with reference to FIG. 1, a device 100 for generating power in an assembly line is disclosed herein. The device 100 is adapted to be coupled with or otherwise secured to a load-carrying conveyance 250, such as a conveyer platform, a push dolly, or an automatic guided vehicle. For example, the device 100 can be integral to the conveyance 250, or can be welded or coupled via adhesive, bolts or other fasteners, or any other suitable means. In some implementations, the device 100 can be secured to the conveyance 250 by friction, such as would result from the gravitational force of a conveyance 250 resting substantially on a device 100. In the exemplary illustration of FIG. 1, the device 100 includes a coupling plate 102 and multiple fasteners 104 to secure the coupling plate to a conveyance 250.

The conveyance 250 will typically include wheels (not shown) or other transport means enabling the conveyance 250 to move in a direction represented in FIG. 1 by an arrow of translation T relative to a stationary surface 200. The device 100 includes a drive wheel 120 configured to be placed into an interference position with the stationary surface 200. The stationary surface 200 can be any surface, such as the ground, a floor surface, a rail, or a wall, that the device 100 passes as it moves with the conveyance 250.

With continued reference to FIG. 1, the drive wheel 120 can be "in an interference position with the stationary surface 200", for example, when the drive wheel 120 exerts a force, F, on the stationary surface 200; the force, F, being sufficient to enable rotation of the drive wheel 120 when the conveyance moves in a direction of translation, T. Rotation of the drive wheel can occur at a rate, R, definable in rotations-per-minute (RPM). In some implementations, the device 100 can be configured so that drive wheel 120 can be reversibly moved into and out of an interference position with the stationary surface 200.

The device 100 further includes a generator 110, the generator including at least one rotatable element 112, optionally coupled to a transmission 130 as discussed in more detail below. Rotation of the rotatable element 112 causes at least one conducting loop to move relative to at least one magnetic field and thereby causing an electric current to flow across a potential difference, provided the generator is incorporated into a suitable circuit. The rotatable element 112 (and thus the relative rotation of the at least one conducting loop and the at least one magnetic field) can have a rate of rotation, R', measurable in RPM. Rotation of the rotatable element 112 can alternatively be referred to as operation of the generator 110.

In many implementations, the generator 110 can be a low-RPM generator, such as a permanent magnet alternator, configured to generate electrical power at a useable level when the rotatable element 112 is rotated at relatively low RPM. In some implementations, the generator 110 can be configured to generate an average of at least 20 watts of electrical power when operated at less than 600 RPM. In some implementations, the generator can be configured to generate an average of at least 20 watts of electrical power when operated at less than 300 RPM. In an example, a low RPM generator 110 such as is used in a wind turbine can be employed in the device 100.

Figure 2A:
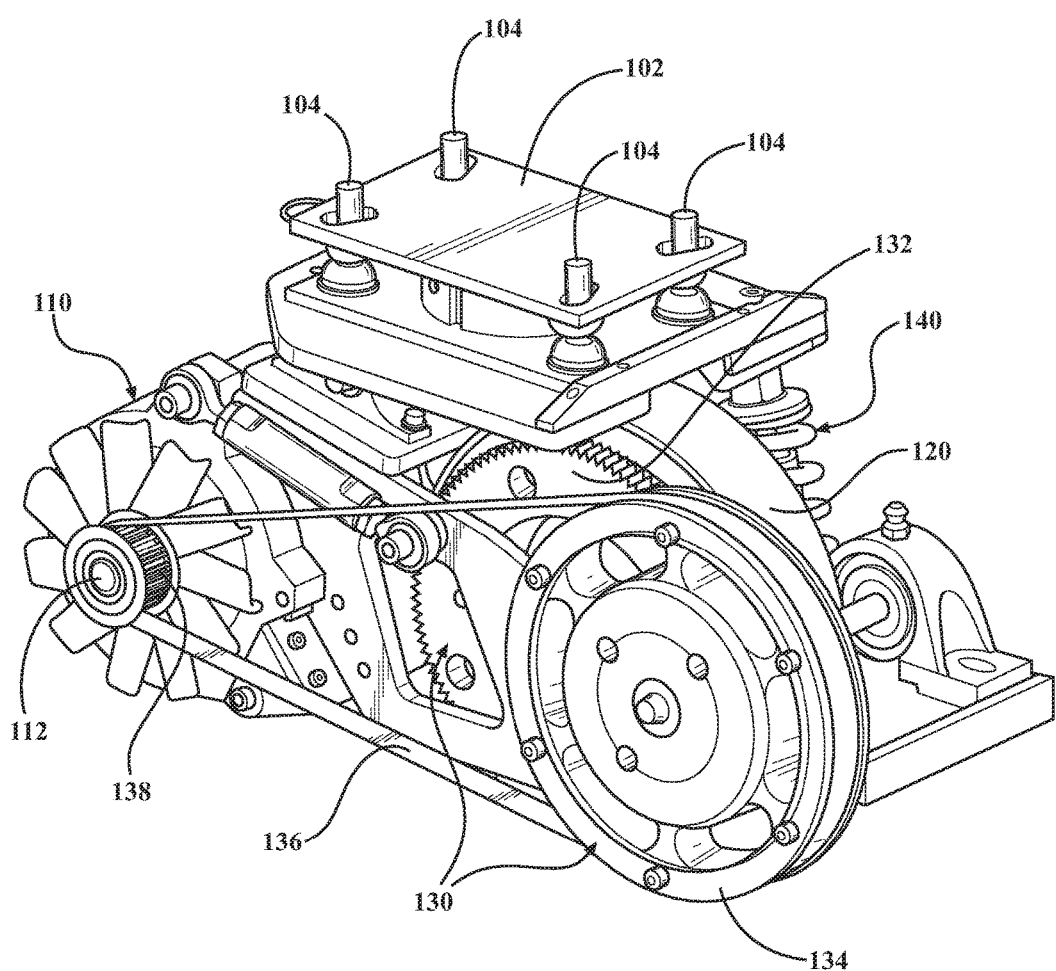
FIGS. 2A and 2B are perspective views of the device of FIG. 1, FIG. 2B includes a cutaway to reveal a second gear in a transmission of the device.
Figure 2B:
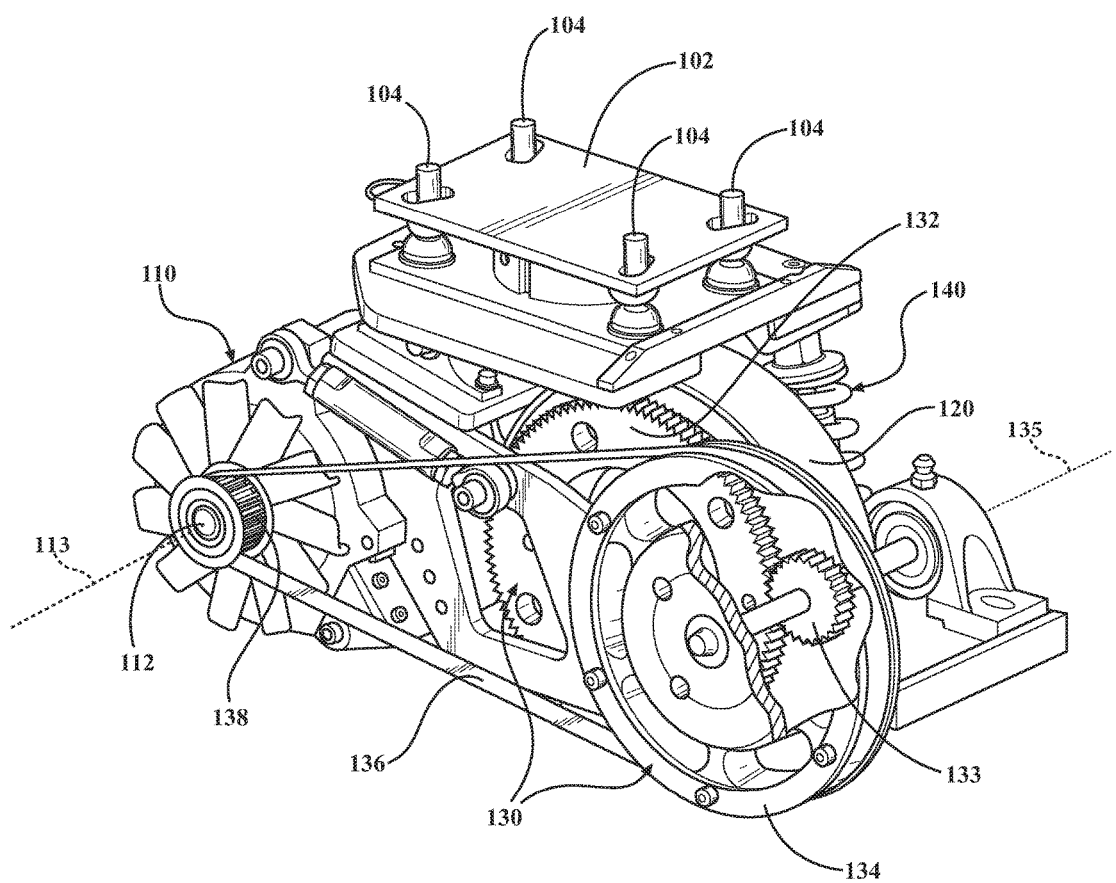

The device can further include a transmission 130 configured to transmit rotation of the drive wheel 120 into rotation of the rotatable element 112. The transmission 130 can include any suitable configuration, including but not limited to a multi-belt transmission, friction drive, gear-to-gear, and any combination thereof. As such, the transmission 130 can include one or more gears 132, wheels 134, toothed drive belts 136, or untoothed drive belts. In the example of FIGS. 2A and 2B, the transmission 130 includes a first gear 132 directly connected to and rotating at the same speed R as the drive wheel 120. As shown in FIG. 2B, the first gear 132 is in toothed contact with a second gear 133, attached to and rotating at the same speed as drive belt wheel 134. A toothed drive belt 136 is wrapped around a drive belt wheel 134 and a drive belt wheel 138, the latter of which is integral with the rotatable element 112. As shown in FIG. 2B, the drive wheel 134 is rotatable about a first axis 135; and the rotatable element 112 is rotatable about a second axis 113, different from the first axis.

In many implementations, the device 100 has a gear ratio defined as R/R'; the rate of rotation in RPM of the drive wheel 130 divided by the rate of rotation in RPM of the rotatable element 112. This may also be written in typical ratio form as R:R'. In many implementations, the device 100 will have an "overdrive" gear ratio, i.e. a gear ratio of less than 1:1, such as 1:1.5. In some implementations, the device 100 can have a gear ratio of 1:10 or lower. For example, a gear ratio of 1:12 (or 0.833) is considered lower than a gear ratio of 1:10, whereas a gear ratio of 1:8 (or 0.125) is considered higher than a gear ratio of 1:10. In some implementations, the device 100 can have a gear ratio of 1:20 or lower. In some implementations, the device 100 can have a gear ratio of 1:50 or lower. In some implementations, the device 100 can have a gear ratio of 1:100 or lower. At a gear ratio lower than 1:100, the rotatable element 112 undergoes more than one hundred revolutions for every revolution of the drive wheel 130.

In implementations in which the device 100 has a gear ratio substantially lower than one (i.e. where one revolution of the drive wheel 130 results in many revolutions of the rotatable element 112) a substantial translation force, in the direction of translation, T, must be applied at the contact point between the stationary surface 200 and the drive wheel 120 in order to turn the drive wheel 120 and thus turn the rotatable element at the substantially increased rate. This requires that the drive wheel 120 not slip on the stationary surface 200 as the conveyance 250 moves in the direction of translation T.

In some implementations, slipping of the drive wheel 130 is prevented by friction between the drive wheel 130 and the stationary surface 200. Friction sufficient to prevent slipping of the drive wheel can be obtained by application of a substantial force, F, to the stationary surface 200 by the drive wheel 130. In some implementations, the device 100 can include a suspension 140 configured to apply or modify the contact force, F, applied by the drive wheel 130 to the stationary surface 200.

In some variations, a suspension 140 can include a resilient member, such as a coil 144 encircling a piston and cylinder 142 in the example of FIGS. 1 and 2. In the same or other implementations, a suspension 140 can include an adjustment element that is configured to reversibly modify the contact force, F, in response to a user-originated or computer-originated input. In this aspect, reversible modification of the contact force, F, can include reversible removal of the contact force, during which the drive wheel 130 is not in an interference position with the stationary surface 200. For example, a suspension 140 can include a lever or electromechanical device configured to move the drive wheel 120 into and out of contact with the stationary surface 200. Such a suspension 140 can be used to activate the generator 110 when energy generation is desired and to deactivate the generator 110 when energy generation is not desired.

In the exemplary illustration of FIG. 1, the suspension 140 includes a piston and cylinder 142 surrounded by a resilient coil 144. The piston and cylinder attaches at one end to a main housing 150 and at the opposite end to an upper bracket 152. The exemplary suspension 140 also includes a hinge element 146 that also attaches the main housing 150 to the upper bracket 152 and allows the main housing 150 and upper bracket 152 to pivot relative to one another as the piston and cylinder 142 is compressed or the resilient coil 144 expands.

In some variations, the generator 110 can be in electrical communication with one or more electrical devices, such as electrical lights. Such electrical devices will typically be mounted on the conveyance 250 and can derive their operating power directly or indirectly from the device 100. For example, one or more lights used to illuminate a portion of the conveyance 250, or to illuminate a load carried by the conveyance, can be powered by the generator 110. In the same or other variations, the generator 110 can be placed in electrical communication with an energy storage device, such as a secondary (i.e. rechargeable) battery. Such an energy storage device can be used to power electrical devices with energy derived from the generator 110, even when the generator 110 is not operating, such as when the conveyance 250 is not moving.

In some variations in which the generator 110 is placed in electrical communication with a battery, the generator 110 can be a DC generator, such as a generator 110 having split-ring commutator. In other variations in which the generator 110 is placed in electrical communication with a battery, the generator 110 can be in electrical communication with a device, such as a diode or a rectifier, configured to convert AC output from the generator 110 to DC.

Figure 3A:
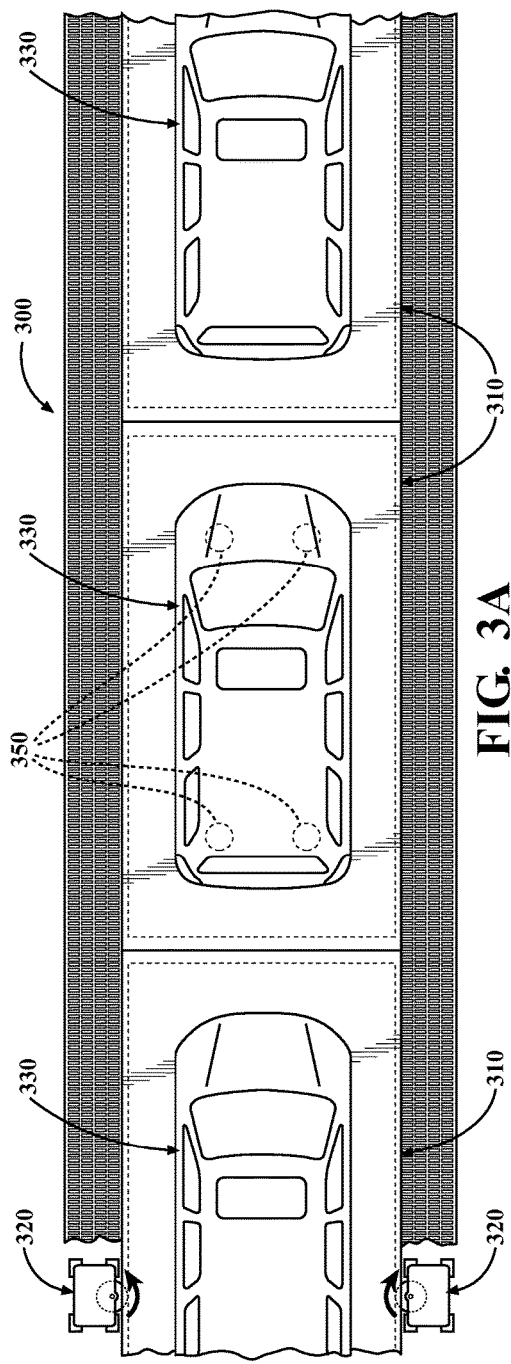
FIG. 3A is an overhead plan view of a conveyer system.
Figure 3B:
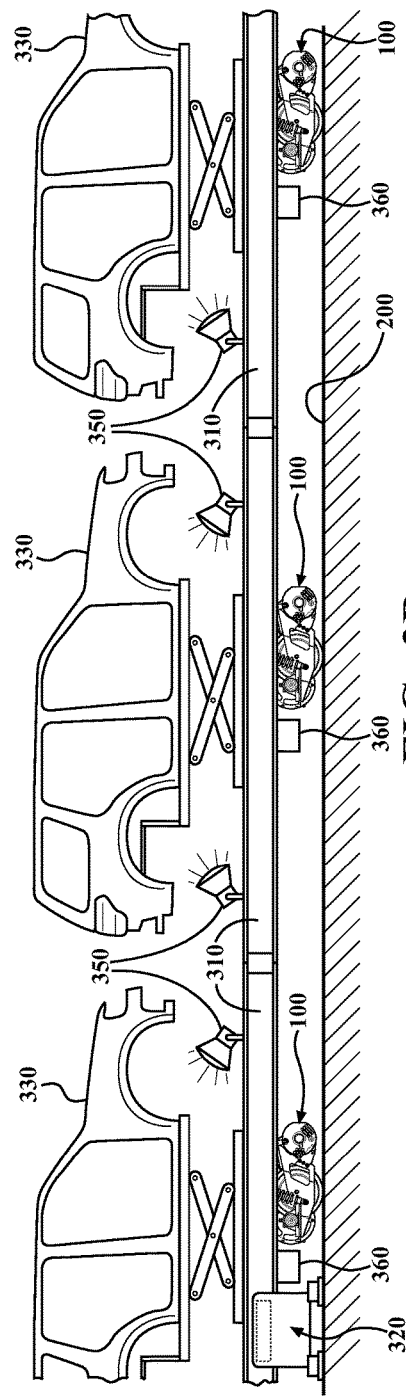
FIG. 3B is a side plan view of the conveyer platforms of the conveyer system of FIG. 3A, the platforms equipped with the device of FIG. 1 to generate power.

An implementation of the present disclosure is shown in FIGS. 3A and 3B. A conveyer system 300 includes one or more conveyer platforms 310, or "skillets", each skillet moves along an assembly line by conveyor motors 320. An assembly 330, in the example of FIGS. 3A and 3B an automobile assembly, is positioned on, and carried by, each conveyer platform 310. In this example, an individual conveyer platform 310 can be regarded as analogous to the conveyance 250 of FIGS. 1 and 2.

Each conveyer platform 310 is equipped with an energy generation device 100, the device 100 positioned so that the drive wheel 120 contacts the ground. The ground in this example serves as the stationary surface 200, and each device 100 generates electrical energy as its respective conveyer 310 platform moves relative to the ground. Each conveyer platform can have a battery 360 configured to store electrical energy produced by the device 100, as well as one or more auxiliary devices, such as lights 350 positioned to illuminate the undercarriage of the automobile assembly and powered by the battery 360.

Figure 3C:
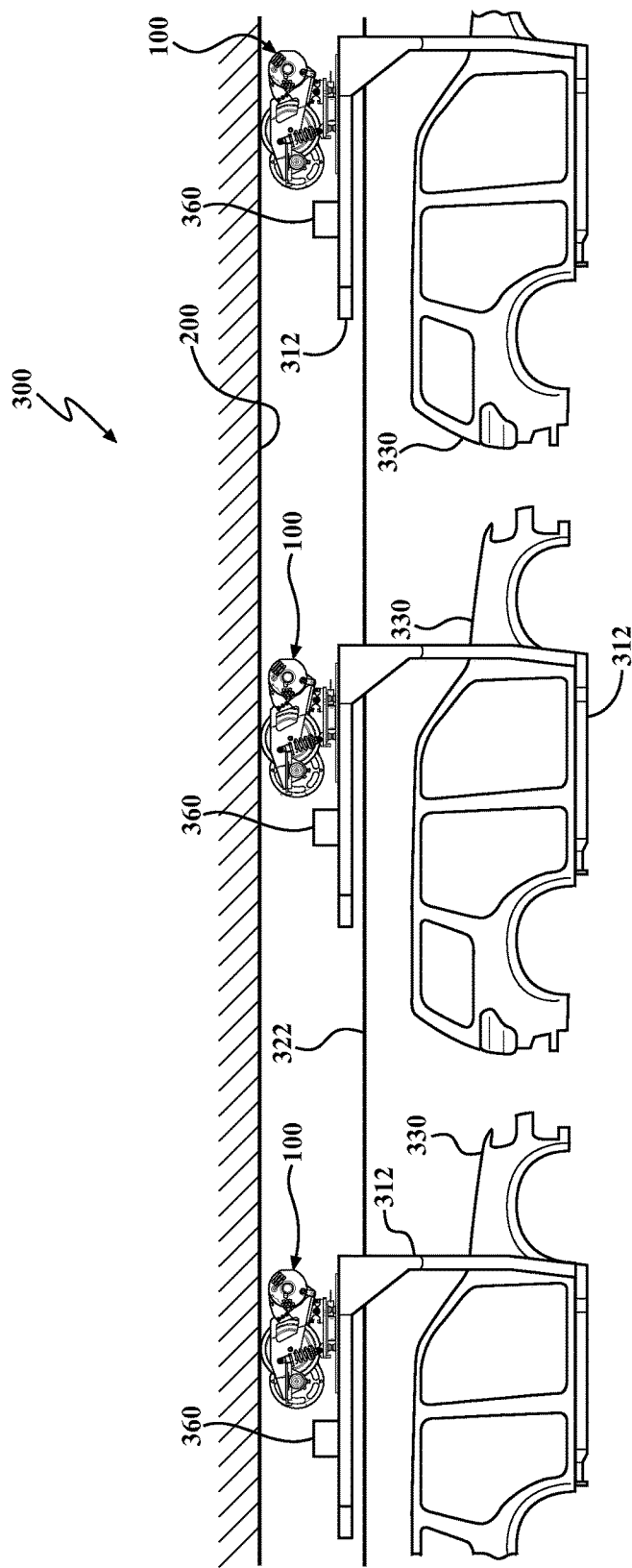
FIG. 3C is a side plan view of another conveyer system equipped with the device of FIG. 1 to generate power.

FIG. 3C shows a variant of the conveyer system 300 of FIGS. 3A and 3B. In contrast to FIGS. 3A and 3B, the conveyer system 300 of FIG. 3C is an overhead conveyer system having a plurality of suspended transports 312, each suspended transport 312 being another type of conveyance 250. Each suspended transport 312 is configured to carry an assembly 330, and is supported on a support 322. It will be appreciated that the support 322 can be a rail, a cable, or any other structure suitable to support suspended conveyance of suspended transport 312. Each suspended transport 312 is equipped with an energy generation device 100, the device 100 positioned so that the drive wheel 120 contacts the stationary surface 200. In this instance, the stationary surface 200 can be a ceiling, rail, or other appropriately positioned surface.

As above, movement of a suspended transport 312 relative to the stationary surface 200 can cause the energy generation device 100 associated with that suspended transport 312 to supply energy to a device, the device potentially including the battery 360.

It is to be appreciated that a conveyer system 300 of the present disclosure can be powered or manual. For example, the conveyer system 300 of FIG. 3C can have a friction drive system or other drive system in which a drive motor is integrated into each suspended transport 312, or in which the support 322 moves and causes every suspended transport 312 to move in conjunction. Alternatively, the force to move a suspended transport 312 can be provided by a human user, by a robot, or by another external operator.

Figure 4:
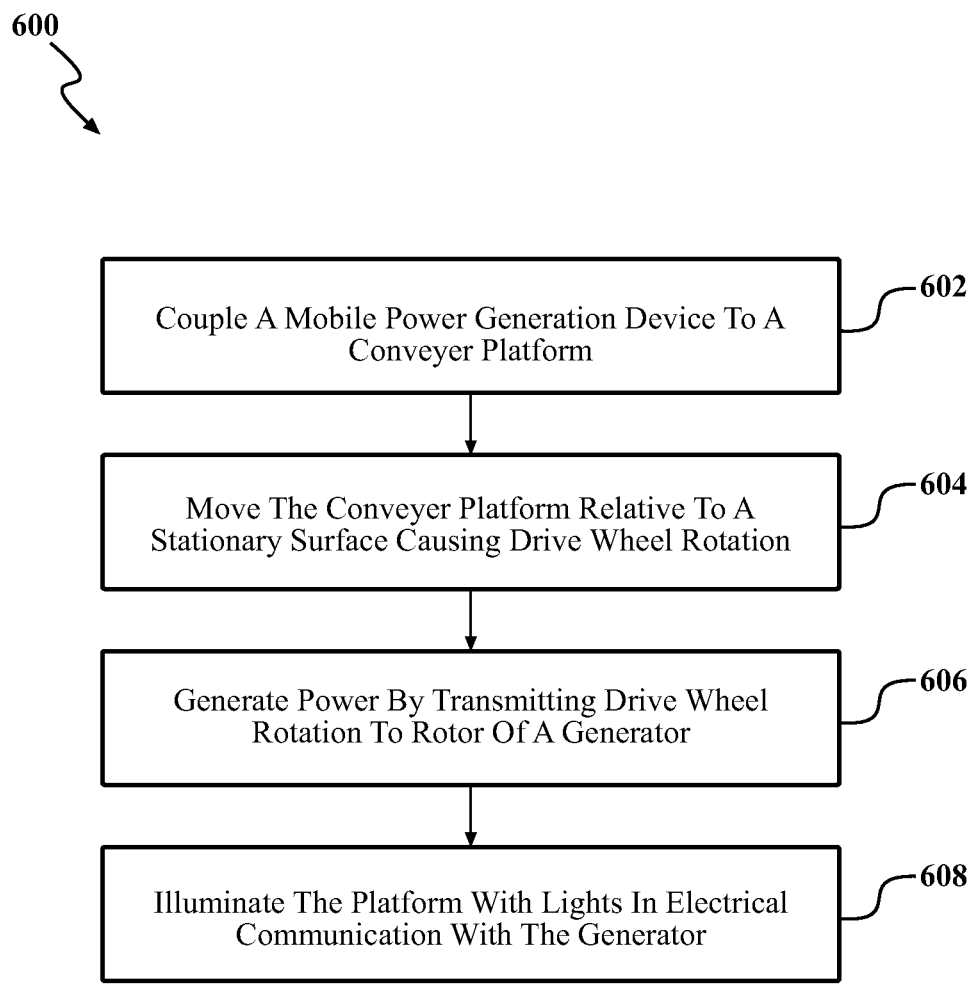
FIG. 4 is a flow diagram of a method for providing lighting to a conveyer platform.

Also disclosed, and illustrated schematically in FIG. 4, is a method 600 for providing lighting to a conveyer platform 310. The method comprises a step 602 of coupling a mobile power generation device 100 to the conveyer platform 310. The mobile power generation device 100 is as described above in all respects, and has a generator 110 and a drive wheel 120, the latter configured to be placed in an interference position with a stationary surface 200. As above, the generator 110 includes a rotatable element 112, rotation of which result in the production of electrical power. The method 600 additionally includes a step 604 of moving the conveyer platform relative to the stationary surface 200, resulting in rotation of the drive wheel 120. The method 600 further includes a step 606 of generating power by transmitting rotation of the drive wheel 120 to rotation of the rotatable element 112. The method 600 further includes a step 608 of illuminating a platform space with one or more lights 350 that are in electrical communication with the generator 110. A "platform space" can be a surface of the conveyer 310, an assembly 330 or other article that is supported on the conveyer 310, or any other space in the vicinity of the conveyer 310.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A mobile power generation system for an automotive assembly line, the system comprising:
    a plurality of conveyor platforms, each conveyor platform configured to move along the assembly line while supporting an automobile assembly, and each conveyor platform including a mobile power generation device having:
        a drive wheel rotatable about a first axis, the drive wheel configured to be placed in an interference position with a stationary surface, such that movement of the platform past the stationary surface when the drive wheel is in the interference position causes rotation of the drive wheel; and
        a generator having a rotatable element rotatable about a second axis, different from the first axis, the rotatable element being in mechanical contact with the drive wheel, such that movement of the platform past the stationary surface causes rotation of the rotatable element, resulting in production of electrical power; and
        a transmission configured to transmit rotation of the drive wheel to the rotatable element at a gear ratio less than 0.1, such that a rotation rate of the rotatable element, in rotations-per-minute (RPM), is more than ten times greater than a rotation rate of the drive wheel, in RPM.

2. The mobile power generation system as recited in claim 1, wherein the transmission is configured to transmit rotation of the drive wheel to the rotatable element at a gear ratio less than 0.01, such that the rotation rate of the rotatable element is more than one hundred times greater than the rotation rate of the drive wheel.

3. The mobile power generation system as recited in claim 1, further comprising a suspension in mechanical communication with the drive wheel and configured to modify a contact force applied by the drive wheel on the stationary surface.

4. The mobile power generation system as recited in claim 1, comprising a battery in electrical communication with the generator.

5. The mobile power generation system as recited in claim 1, wherein the generator is in electrical communication with one or more lights configured to illuminate a portion of the automobile assembly supported by the conveyor platform.

6. A mobile power generation device comprising:
    a drive wheel, rotatable about a first axis, and configured to be placed in an interference position with a stationary surface, such that movement of the device past the stationary surface when the drive wheel is in the interference position causes rotation of the drive wheel;
    a generator, separate from the drive wheel, having a rotatable element rotatable about a second axis, such that rotation of the rotatable element causes the generator to produce electrical power;
    a transmission configured to transmit rotation of the drive wheel to the rotatable element at a gear ratio less than 0.1, such that a rotation rate of the rotatable element, in rotations-per-minute (RPM), is more than ten times greater than a rotation rate of the drive wheel, in RPM; and
    a suspension member in mechanical communication with the drive wheel and configured to modify a contact force applied by the drive wheel on the stationary surface, the contact force effective to prevent the drive wheel from slipping.

7. The mobile power generation device of claim 6, wherein the transmission has a gear ratio less than 0.01, such that rotation rate of the rotatable element is more than one hundred times greater than the rotation rate of the drive wheel.

8. The mobile power generation device of claim 6, wherein the generator is configured to produce at least 20 W of electrical power when operated at less than 600 RPM.

9. The mobile power generation device of claim 6, wherein the generator is configured to produce at least 20 W of electrical power when operated at less than 300 RPM.

10. A method of providing lighting to a conveyor platform traveling along an automotive assembly line, the method comprising:
    coupling a friction-driven, mobile power generation device to the conveyer platform, the conveyer platform configured to support an automobile assembly, the device comprising:
        a drive wheel rotatable about a first axis and configured to be placed in an interference position with a stationary surface, such that movement of the platform past the stationary surface when the drive wheel is in the interference position causes rotation of the drive wheel; and a generator having a rotatable element, rotatable about a second axis, different from the first axis, the rotatable element being in mechanical contact with the drive wheel, such that movement of the platform past the stationary surface causes rotation of the rotatable element, resulting in production of electrical power;

moving the conveyor platform relative to the stationary surface resulting in rotation of the drive wheel;

generating power by transmitting rotation of the drive wheel to rotation of the rotatable element; and illuminating the automobile assembly with one or more lights that are in electrical communication with the mobile power generation device.

11. The method according to claim 10, comprising illuminating an undercarriage of the automobile assembly.

12. The mobile power generation system as recited in claim 5, wherein the one or more lights are positioned to illuminate an undercarriage of the automobile assembly.

* * * * *